United States Patent [19]

Brüssel

[11] Patent Number: 5,019,204
[45] Date of Patent: May 28, 1991

[54] METHOD OF PRODUCING MAT PACKETS FROM SHEETS OF ADHESIVE MATERIAL AND APPARATUS FOR IMPLEMENTING THE METHOD

[75] Inventor: Richard Brüssel, Sulzfeld, Fed. Rep. of Germany

[73] Assignee: Krupp Maschinentechnik GmbH, Essen, Fed. Rep. of Germany

[21] Appl. No.: 433,336

[22] Filed: Nov. 8, 1989

[30] Foreign Application Priority Data

Nov. 11, 1988 [DE] Fed. Rep. of Germany ....... 3838270

[51] Int. Cl.$^5$ ............................................. B32B 31/00
[52] U.S. Cl. ..................................... 156/264; 83/14; 83/29; 83/42; 83/86; 83/276; 83/649; 156/270; 156/512; 414/793.4; 414/794
[58] Field of Search ................... 83/14, 29, 42, 86, 91, 83/276, 282, 438, 649, 922; 156/512, 270, 576, 264, 573; 414/793.4, 794

[56] References Cited

U.S. PATENT DOCUMENTS

| | | | |
|---|---|---|---|
| 2,809,696 | 10/1957 | Miller | 83/438 |
| 3,798,108 | 3/1974 | Ioannilli | 83/649 X |
| 3,910,425 | 10/1975 | Mahara et al. | 414/793.4 X |
| 4,072,554 | 2/1978 | McKibben | 83/922 X |
| 4,300,420 | 11/1981 | Haenni | 83/92 |
| 4,474,093 | 10/1984 | Neubuser et al. | 83/91 X |

FOREIGN PATENT DOCUMENTS 2359856  6/1975  Fed. Rep. of Germany .

*Primary Examiner*—Douglas D. Watts
*Assistant Examiner*—Eugenia A. Jones
*Attorney, Agent, or Firm*—Spencer & Frank

[57] ABSTRACT

The present invention relates to a method and an apparatus for producing mat packets from panels of an adhesive material which adhesive material is covered with release layers. The panel of adhesive material is advanced sequentially through a feed device, a clamping device, a release layer removing device and a cutting device. The leading edge of the panel, with the release layers removed, extends freely beyond the clamping device toward the cutting device. The panel is advanced in increments corresponding to the length of the mat strip to be produced, and, when the panels are clamped by the clamping device, the panels with release layers removed are cut into mat strips, which are deposited on a transporting device in stacks of several on top of one another to form a mat packet. In order to improve the economy and operational reliability of the method and of the apparatus, a supporting element is moved underneath the freely extending end section of the panel to support the panel and move in synchronism with the advancing of the panel. When the advancing of the panel is stopped, the supporting element is removed from underneath the panel and the mat strip is cut from the panel such that each mat strip is deposited on the transporting device or stacked on any mat strips previously deposited on the transporting device.

10 Claims, 4 Drawing Sheets

METHOD OF PRODUCING MAT PACKETS FROM SHEETS OF ADHESIVE MATERIAL AND APPARATUS FOR IMPLEMENTING THE METHOD

CROSS REFERENCE TO RELATED APPLICATION

This application claims the priority of Federal Republic of Germany Application No. P 3838270.9 filed Nov. 11th, 1988 which is incorporated herein by reference.

BACKGROUND OF THE INVENTION

The present invention relates to a method of producing strip stacks, also referred to as mat packets, from sheets or panels of adhesive material which are covered with release layers, particularly SMC resin mat panels. A sheet of material is advanced sequentially past a clamping device and a release layer removing device to a cutting member. The sheet is advanced a longitudinal distance corresponding to the desired width of a mat strip to be produced, the release layers are removed, and the sheet is held in the clamping device and cut to form the mat strip which is then deposited on a transporting member. The process is repeated such that a plurality of mat strips are deposited in a vertical stack one on top of one another to thus form a mat packet. The invention further relates to an apparatus for implementing the method including a feed device for advancing the sheet or panel of material past a clamping device into the region of a cutting member. The apparatus further includes a release layer removing device positioned between the clamping device and the cutting device, and a vertically and horizontally movable transporting member which can be moved underneath the mat strips which are produced.

In order to economically produce molded components from the hardenable molding material involved here, which is referred to as SMC or sheet molding compounds, by means of pressing tools, it is desirable to substantially automate the process steps between the storage of the sheet or panel of material in its preliminary form and the feeding of the sheet or panel, in the form of mat packets, to a pressing tool.

In the prior art methods and apparatus, the SMC resin mat panel, which is normally wound or coiled in rolls and covered with release layers, is unwound by means of a feeding device equipped with feed rollers, the release layers are removed, and a cutting member cuts the material into mat strips of a suitable length which are referred to as blanks. By depositing or stacking several mat strips on top of one another, a mat packet is formed which is then processed in a pressing or deforming tool.

In the prior art, the mat strip produced in the cutting process rests on a transporting member such as a conveyor belt, a plurality of mutually parallel narrow conveyor belts or a pusher strip. The mat strip to be processed is taken from the transporting member by suction or by needle grippers and is deposited at a stacking station, where a mat packet is formed by the superposition of several mat strips on one another.

The drawback of this type of method and apparatus is that a relatively long period of time is required to form the mat packet and the devices for picking up and transporting the mat strips are technically complicated. Furthermore, the adhesive properties of the mat strips often result in the strips becoming soiled.

SUMMARY OF THE INVENTION

It is an object of the present invention to provide a method and an apparatus for implementing the method which permit the formation of the mat packet in a shorter period of time, and with relatively inexpensive equipment, and with a reduction in the sensitivity to soiling the adhesive strips and soiling the equipment.

This is accomplished by a method of producing mat packets wherein after the release layers are removed from the sheet material which is to be subdivided into the mat strips, then as the sheet material is advanced or fed, the sheet material is briefly supported by a supporting element, preferably in the form of a rake that is pushed underneath the sheet material until the sheet material is subjected to the cutting process and cut to the desired length. Thereafter, the supporting element is removed and the mat strip is deposited directly on a transporting unit which is preferably in the form of a stacking rake. This process is repeated to form a mat packet by stacking a series of mat strips one on top of another. The transporting unit then transports the gradually assembled mat packet to the pressing tool. The method and apparatus thus eliminate the need for additional gripping elements.

The method can advantageously be performed by moving a supporting element along a linear path to lie under the free end of the sheet material, and the sheet of material is divided into mat strips having the required strip length by cuts that are oblique with respect to the plane of the panel.

The apparatus for practicing the present invention and for performing the method of the present invention includes the provision of a supporting member which is moved underneath the freely projecting end section of the sheet of material in the vicinity of the cutting member. The supporting member moves away from the cutting device by an amount corresponding to the length of the strip being formed, while still supporting the sheet of material. When the advancing movement stops, the supporting member can be pulled away from or withdrawn from the end section of the sheet of material. Synchronization between the advancing movement and the concomitant movement of the supporting member may be realized in a simple manner in that, during this period of time, the drive of the supporting member, which is preferably configured as a rake that is pushed underneath the material, is controlled by the drive for the advancing device for the sheet of material.

In a particularly simple embodiment of the apparatus of the present invention, the supporting member is mounted for reciprocating motion along a linear guide path.

In order to ensure that the supporting member is able to extend below the end section of the sheet of material under different operating conditions, the guide path may be slightly inclined relative to the plane of the sheet of material.

Another variation for adapting the positioning of the supporting member to different operating conditions is to make the supporting member pivotal relative to the guide path and retainable in different pivoted positions by means of a pivot drive. Such an embodiment makes it possible to move the supporting member in its pivoted-down state in a straight line along the guide path until the supporting member is below the end section of the sheet of material and then pivot the supporting member upwards relative to the guide path to bring the supporting member in contact with the end section and retain the supporting member in this supporting or carrying position.

Yet another embodiment of the apparatus of the present invention includes curving downwardly, relative to the plane of the sheet of material, a portion of the supporting member which engages under the end section of the sheet of material. Such an embodiment ensures that the supporting region of the supporting member is able to move under the end section of the sheet material without unnecessarily getting caught in the end section.

Another embodiment of the present invention, which will, under certain circumstances, improve the operational reliability of the apparatus, is that the supporting surface of the supporting member, i.e., that portion of the supporting member which faces the end section of the sheet material, is given an adhesion reducing configuration. For example, it is possible to provide a coating which reduces the effect caused by the adhesive sheet of material but only to such an extent that the carrying effect of the supporting element is not jeopardized.

Since it is desireable to form the mat packet closely adjacent to the cutting means, the cutting means is provided with a cutting member that is placed at an oblique angle relative to the plane of the sheet of material. This oblique positioning ensures a small clearance from the cut surface of the previously produced mat strip that has been deposited on the transporting device.

BRIEF DESCRIPTION OF THE DRAWINGS

The foregoing features of the present invention, together with other features, advantages and benefits which may be attained by its use, will now be described in greater detail with reference to the drawing figures.

DETAILED DESCRIPTION OF THE INVENTION

Figure 1:
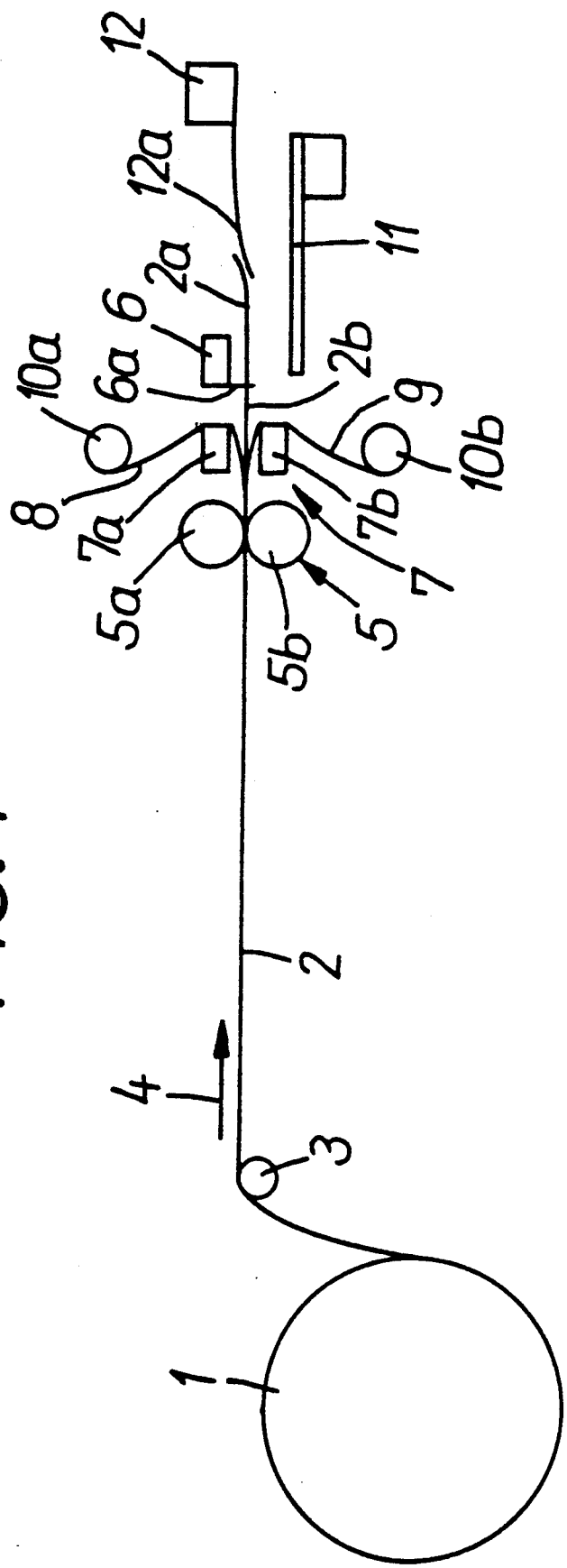
FIG. 1 is a schematic elevation representation showing the treatment of an SMC resin mat panel up to the formation of a mat packet according to the principles of the present invention.

Referring to the drawings, an SMC resin mat panel 2 is unwound from a coil 1 in the direction of arrow 4 while being supported by a guide roller 3 and is advanced in a generally horizontal plane by a feed device 5 which includes opposed feed rollers 5a and 5b which contact the opposite sides of the resin mat panel. Release layers are provided on the surfaces of the resin mat panel. The resin mat panel is advanced to a cutting device 6 equipped with a cutting member 6a.

A clamping device 7, comprising a pair of opposed, height adjustable clamping jaws 7a and 7b, is positioned intermediate the feed device 5 and the cutting device 6. The clamping device is open during the advancing of the panel and functions to clamp or secure the resin mat panel 2 during the cutting step.

With clamping device 7 open, clamping jaws 7a and 7b are spaced apart vertically and upper and lower release layers 8 and 9 may be removed from the top and bottom of the resin mat panel 2. This is accomplished by upper and lower stripping rollers 10a and 10b, respectively, which form a release layer removal device. The release layer removal device is positioned intermediate the clamping device 7 and the cutting device 6. An end section 2b of the resin mat panel is formed as the release layers are removed from the resin mat panel by the stripping rollers and the end section extends freely beyond the clamping device.

Feed device 5 now advances or moves the resin mat panel 2 toward the cutting device 6, i.e, in the direction of arrow 4 which is to the right as illustrated in FIG. 1, by an amount corresponding to the desired length of a mat strip, during which time release layers 8 and 9 are stripped off from the resin mat panel. Then, the advancing of the resin mat panel is stopped and clamping device 7 is closed on the resin mat panel, after which actuation of cutting device 6 causes a mat strip 2a to be formed which is to be deposited directly or indirectly onto a vertically and horizontally movable stacking rake 11.

According to the principles of the present invention, a supporting means preferably in the form of a rake 12 which extends underneath the panel or sheet material is provided. The supporting means has a supporting region 12a directed toward the left which supporting region can be brought to lie underneath the freely extending end section 2b of resin mat panel 2. This is accomplished by mounting the rake 12 to be movable along a guide path and the rake includes a supporting region 12a which is curved downwardly relative to the plane of the resin mat panel.

Prior to the advancing of the resin mat panel, the rake 12 is moved toward the left such that supporting region 12a is positioned below the projecting end section 2b of the mat panel. Clamping device 7 is released or opened and feed device 5 is started. The rake 12 is moved to the right in synchronism with the feeding movement, in order to support resin mat panel 2 over a distance which corresponds to the length of the mat strip. Then the feed device is stopped and the clamping device actuated to close or clamp the mat panel.

After resin mat panel 2 has been clamped by actuation of clamping device 7, the stacking rake 11 is moved underneath a mat strip 2a which is to be severed and rake 12 is pulled out to the right, i.e., removed from under the mat strip, before actuation of cutting device 6. Thereafter, the actuation of the cutting devices produces another mat strip 2a to be received by stacking rake 11.

Multiple repetition of the aforementioned steps with the temporary insertion of the rake 12 under the resin mat during the advancing of the resin mat makes it possible to directly produce a mat packet without the use of additional gripping members or other devices in that each mat strip 2a, as produced, can be stacked on stacking rake 11 on top of the preceding mat strip.

Figure 2:
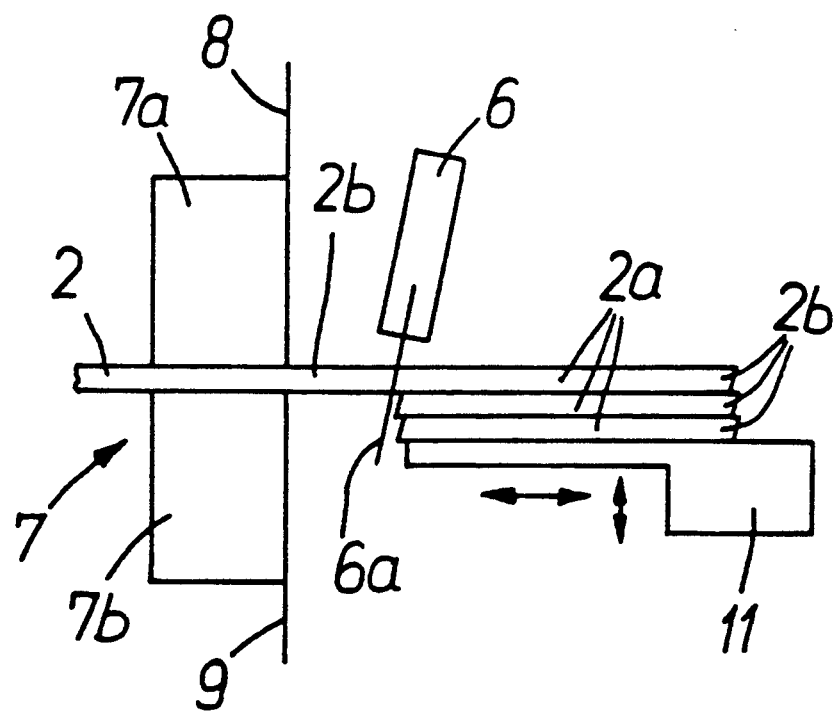
FIG. 2 is a schematic elevation representation of the obliquely positioned cutting member of the cutting device and the formation of the mat packet according to the principles of the present invention.

FIG. 2 illustrates a cutting member 6a of cutting device 6 positioned at an angle relative to the plane of the resin mat panel such that resin mat strips are cut at an oblique angle relative to the plane of resin mat panel 2. The benefit of positioning the cutting member at an oblique angle is that the cutting member may be positioned very closely to the previously produced mat strips 2a but the cutting member does not touch the mat strips as they are stacked on transporting device 11.

The benefit and advantage of the present invention is that it is possible, in particular, without the use of expensive and malfunction prone additional equipment, to form a mat packet closely adjacent to the cutting device which mat packet can be transported to further processing stages, such as in the subsequently connected pressing tool, by means of the transporting device 11.

The ease with which the present invention functions can be improved, under certain circumstances, in that the supporting region 12a of rake 12 lying against the end section 2b of the resin mat panel may be provided with a coating which reduces adhesion between the adhesive resin mat panel and the supporting region and thus facilitates subsequent removal of the supporting region from under the resin mat panel without jeopardizing the supporting and carrying effect of the rake during the forward movement of the panel.

The supporting element may also have a different configuration than described. However, it is important in connection with the principles of the present invention, that the freely projecting section 2b of the resin mat panel is held at least approximately in a position, during its movement in the direction of arrow 4 toward the cutting device, such that section 2b does not adversely affect the subsequent process steps, namely the placement of the mats on the transporting device and the cutting process.

Figure 3:
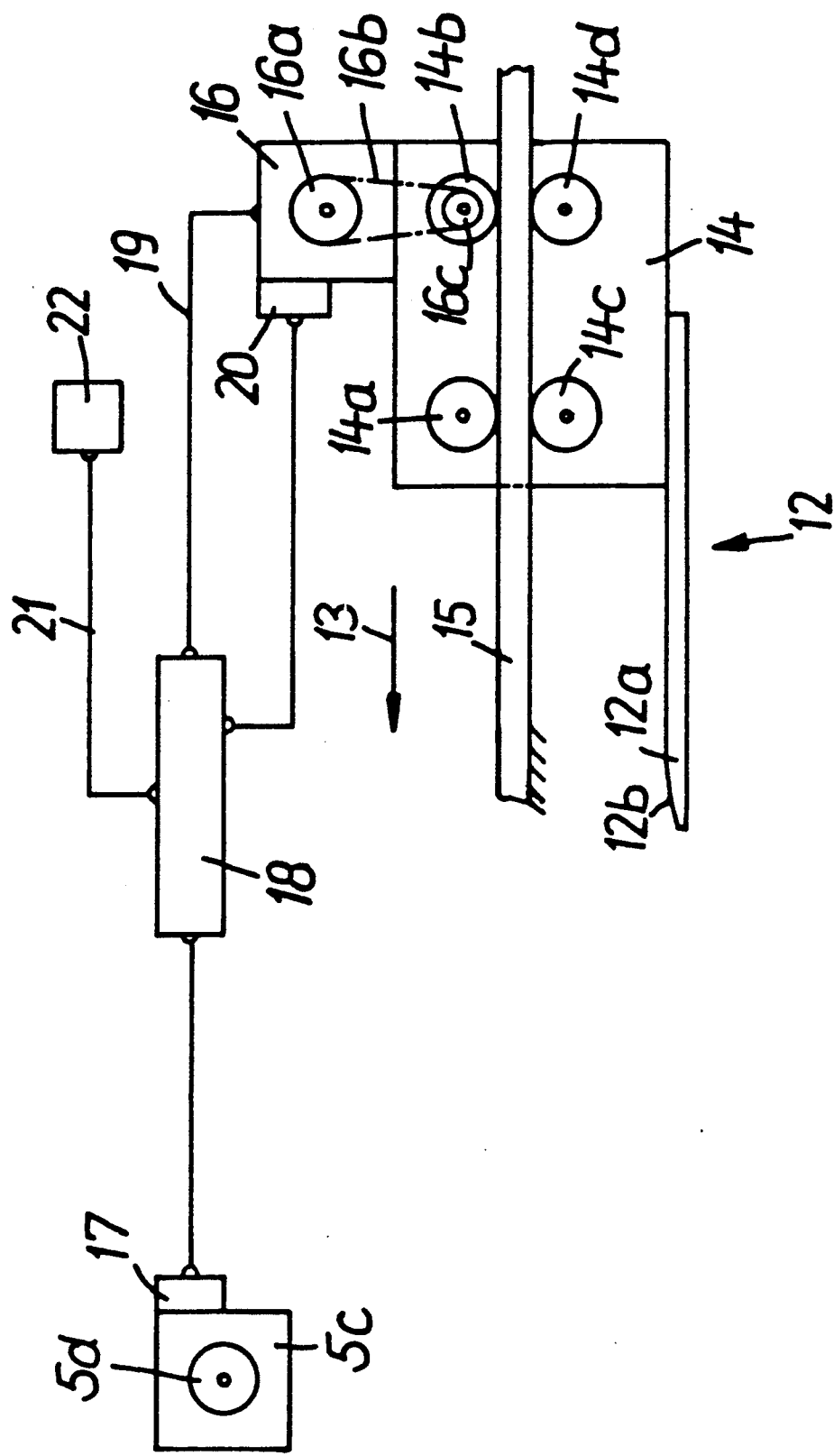
FIG. 3 shows in schematic representation the fastening of a supporting element, by which an SMC resin mat panel can be temporarily carried, on a carriage movable along a guide track and the control link for synchronizing the movement of the supporting element with the feed movement of the SMC resin mat panel.

The aforementioned movement of the supporting rake 12 in the direction of the feed movement (arrow 4 in FIG. 1) and in the direction of the cutting device 6 (arrow 13) is made possible in that said supporting element forms part of a carriage 14 (FIG. 3). This latter is supported at either end by upper guide rollers 14a and 14b and lower guide rollers 14c and 14d on a linear guide track consisting of two side rails 15.

The design of the supporting rake 12 differs from that shown in FIG. 1 in that the supporting region 12a has only a downwardly curved surface 12b.

The carriage 14 is equipped with an electric drive motor 16 which drives a toothed pulley 16c rotating with the guide roller 14b through a toothed pulley 16a and an endless toothed belt 16b. If the toothed pulley 16a is rotating in clockwise direction, the carriage 14 with the supporting rake 12 moves to the right in the direction of the feed movement (arrow 4 in FIG. 1) under the action of the driven guide roller 14b.

Synchronization between the feed movement and the movement of the supporting rake is brought about by a control link between the drive motor 5c moving the upper feed roll 5a (cf FIG. 1) and the drive motor 16 of the carriage 14. The first-mentioned drive motor is connected by a tachogenerator 17—by which the rotational speed of the motor shaft 5d is determined—with a control system 18. The latter, via a control line 19, influences the rotational speed of the drive motor 16 in such a way that the carriage 14 is moved to the right synchronously with the feed movement during the relevant period of time. Monitoring of the rotational speed of the motor shaft (corresponding to the rotational speed of the toothed pulley 16a) is made by a tachogenerator 20 which is driven by the motor shaft and linked to the control system 18.

The control system 18 is further connected by a control line 21 with a control unit 22. This makes it possible to switch off the control system 18 causing synchronization and to reverse the direction of rotation of the drive motor 16 with the result that the carriage 14 with the supporting rake 12 performs a movement (in the direction of arrow 13) towards the cutting device 6 (cf FIG. 1).

Figure 4:
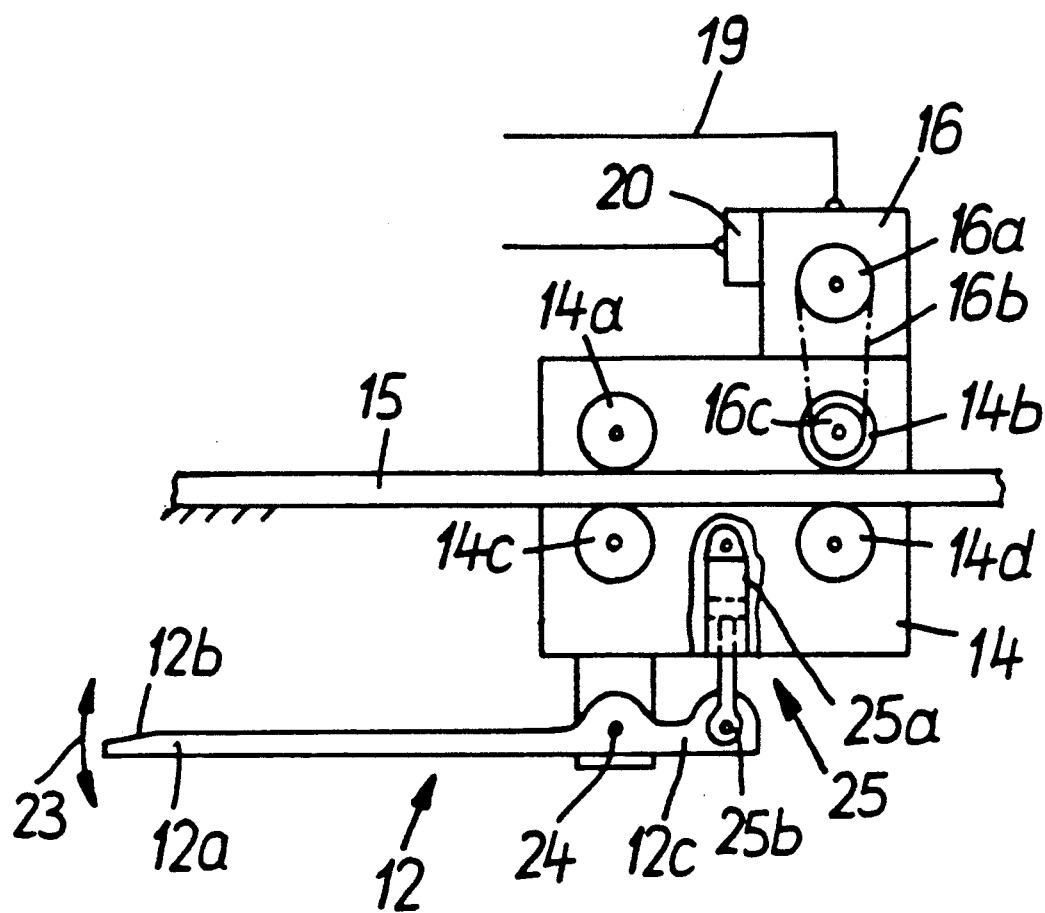
FIG. 4 shows in schematic representation an arrangement with a supporting element which is pivotable relative to its guide track and can be retained at different pivot positions by a pivot drive.

The embodiment according to FIG. 4 differs from the previously described embodiment in that the supporting rake 12 is pivotable in the direction of the double arrow 23 relative to the guide track—embodied by the side rails 15—and can be retained in various pivoted positions.

The supporting rake is supported on a pivot shaft 24 mounted on the underside of the carriage 14 and is connected on its extension 12c opposite the supporting region 12a with a pivot drive in the form of a cylinder assembly 25. The latter is joined on the one hand via its cylinder housing 25a to the bottom part of the carriage 14 and on the other hand via its piston rod 25b to the extension 12c of the supporting rake 12.

By inward movement of the cylinder assembly 25 the supporting rake 12 can be pivoted downwards and moved linearly in this state into the region below the end section of the SMC resin mat panel to be handled (cf FIG. 1). Subsequently the supporting rake 12 can be pivoted upwards by outward movement of the cylinder assembly 25, causing its supporting region 12a to come into contact with the end section to be gripped.

The supporting rake 12 is preferably designed in such a way as to reduce the adhesive effect of the sticky SMC resin mat panel 2 to be handled (cf FIG. 1). This can be effected in particular by providing at least the supporting region 12a of the supporting rake which comes into contact with the SMC resin mat panel 2 with an adhesion-reducing coating, in particular of PTFE (polyfluorethylene).

In a departure from the embodiment shown in FIGS. 3 and 4 the object of the invention can also take the following form: The guide track 15 on its side facing the clamping device 7 (cf FIGS. 1 and 2) is arched downwards and exhibits in cross section the shape of a horizontal U in which the carriage 14 for the supporting rake 12 is movably supported by only two guide rollers. Further, instead of the drive motor 16 a cylinder assembly acting on the carriage 14—in particular a pneumatic cylinder—may be used whose action allows the carriage to be shifted in the required way.

It will be understood that the above description of the present invention is susceptible to various modifications, changes and adaptions, and the same are intended to be comprehended within the meaning and range of equivalents of the appended claims.

What is claimed is:

1. In a method of producing strip stacks from an adhesive panel covered with release layers on opposite panel faces, including the cyclical steps of longitudinally advancing the panel by a feed device through a clamping device to a cutting device in incremental amounts corresponding to the desired width of the strips to be produced, removing the release layers from the portion of the panel which is positioned intermediate the clamping device and the cutting device, thus forming a freely extending end section of the panel, clamping the panel by the clamping device for immobilizing the panel, cutting a strip from the panel with the cutting device while the panel is immobilized to form a strip stack on a transporting device, the improvement subsequent to each cutting step, to form a strip stack, comprising the steps of: moving a supporting element underneath the freely extending end section of the panel which was previously immobilized for supporting the panel; releasing the panel from the clamping device; moving the supporting element away from said cutting device in synchronism with the advancing of the panel and the freely extending end section through the incremental amount; and removing the supporting element from the freely extending end section upon immobilizing the panel and before cutting the strip therefrom.

2. A method as defined in claim 1, wherein the supporting element is brought into contact with the end section of the panel by a linear movement.

3. A method as defined in claim 1, wherein the panel is advanced in a generally horizontal plane and wherein each cut is oblique relative to the plane of the panel.

4. In an apparatus for producing a strip stack from an adhesive panel which is covered with release layers on opposite panel faces, including a feed device for longitudinally advancing the panel in incremental amounts corresponding to the desired width of the strip to be formed, said panel being advanced sequentially through a clamping device, a release layer removal device and a cutting device, the clamping device for immobilizing the panel and said cutting device for cutting a strip from the immobilized panel, said apparatus for positioning a strip on a vertically and horizontally movable transporting device, an end section of the panel being defined as a portion of the panel freely projecting beyond the release layer removal device, the improvement comprising: a supporting element movable underneath the freely extending end section of the panel which was previously immobilized, said supporting element movable in synchronism with the advancing of the panel and the freely extending end section for supporting the end section during the incremental advancing of the panel, the supporting element being removable from under the end section of the panel after the panel has been immobilized but prior to cutting the strip therefrom.

5. An apparatus as defined in claim 4, wherein the supporting element is movable along a linear guide path.

6. An apparatus as defined in claim 4, wherein the supporting element is pivotally mounted relative to a guide path and the apparatus further includes a pivot drive for retaining the support element in different pivoted positions.

7. An apparatus as defined in claim 4, wherein the panel is advanced in a generally horizontal plane, and the supporting element includes a supporting region which faces the end section of the panel, said supporting region being curved downwardly relative to the plane of the panel.

8. An apparatus as defined in claim 4, wherein the supporting element includes a supporting region which faces the end section of the panel, said supporting region for reducing adhesion of the panel to the supporting element.

9. An apparatus as defined in claim 4, wherein the panel is positioned in a generally horizontal plane and wherein the cutting device includes a cutting member oriented at an angle relative to the plane of the panel.

10. In an apparatus for producing a strip stack from an adhesive panel having opposed faces which are initially covered with release layers, including a feed device for advancing the panel sequentially past a clamping device, a release layer removal device and a cutting device, the panel being advanced in increments corresponding to the desired width of the strip and positioned on a vertically and horizontally movable transporting device, wherein a strip is cut from the panel, an end section of the panel defined as a panel portion projecting beyond the release layer removal device, the improvement comprising: support means for engaging the end section of the panel, said support means movable in synchronism with the incremental advancing of the panel for supporting the panel end section during the advancing thereof, said support means disengageable from the end section of the panel upon clamping the panel and prior to cutting the panel with the cutting device such that a strip stack from the panel is formed on the transporting device.

* * * * *